455-4 AU 263 EX ING OF ONE-WAY AMPLIFIERS EXAMINER

E4819 OR 2,843,682

69 Kaul.

July 15, 1958 J. SCHRETZMAYER, JR 2,843,682

PROGRAM TRANSMISSION REVERSIBLE NETWORK

Original Filed Nov. 24, 1953 3 Sheets-Sheet 1

594769

INVENTOR
J. SCHRETZMAYER, JR.
BY John E. Cassidy
ATTORNEY

July 15, 1958 J. SCHRETZMAYER, JR 2,843,682

PROGRAM TRANSMISSION REVERSIBLE NETWORK

Original Filed Nov. 24, 1953 3 Sheets-Sheet 2

INVENTOR
J. SCHRETZMAYER, JR.

BY John E. Cassidy

ATTORNEY

July 15, 1958 J. SCHRETZMAYER, JR 2,843,682

PROGRAM TRANSMISSION REVERSIBLE NETWORK

Original Filed Nov. 24, 1953 3 Sheets-Sheet 3

INVENTOR
J. SCHRETZMAYER JR.
BY
John E. Cassidy
ATTORNEY

United States Patent Office 2,843,682

Patented July 15, 1958

2,843,682

PROGRAM TRANSMISSION REVERSIBLE NETWORK

John Schretzmayer, Jr., Freeport, N. Y., assignor to American Telephone and Telegraph Company, a corporation of New York Continuation of abandoned application Serial No. 394,107, November 24, 1953. This application June 29, 1956, Serial No. 594,769

2 Claims. (Cl. 179—171)

This application is a continuation of my application Serial No. 394,107, filed November 24, 1953, now abandoned, and claim is made to all of the equitable and legal rights derivable therefrom.

This invention relates to telephone transmision systems and more particularly to systems for transmitting radio broadcast programs over wires from any one of a plurality of interconnected broadcast stations to all of the other stations in a network. An object of the invention is to provide a simplified and flexible transmission network employing one-way amplifiers for interconnecting a plurality of broadcast stations whereby any station may assume control of the network and condition all of the amplifiers in the network to transmit from that station to all the other stations.

In a well-known arrangement designed to perform the foregoing function a difficulty has been observed in that when any particular station in the network is to begin to transmit, the amplifiers in the system are switched progressively from the point from which the new program is to originate toward the distant ends of the network. No information is available, at the point from which the new program is to originate, that the amplifiers in the system have been switched, and estimating just sufficient time to permit it is difficult, particularly for those amplifiers most remote from the studio where the new program is to originate.

In the arrangement presently widely used, the control man at the studio where the new program is to originate estimates an interval sufficient for switching all of the amplifiers in the network and, to insure that the amplifiers have in fact been switched, adds a margin of some seconds before beginning the new program. Further, in addition to having to estimate an interval sufficient to permit the amplifiers to be switched and also allowing an interval of some seconds thereafter, for insurance sake, there is another disadvantage in the arrangement of the prior art in that there is no indication afforded at the studio where the new program is to originate that the switching has in fact been effected and the amplifiers are in condition to properly direct the new program.

A feature of the present invention is an arrangement which affords an indication that all of the amplifiers in a system have in fact been switched. This indication is provided at the studio where the new program is to originate and immediately upon its reception it is possible to begin the program without allowing any interval for insurance sake. This affords the advantage that the operation of the indicator gives reasonable assurance that all of the amplifiers in the network have in fact been switched so as to direct the new program properly, and, consequently, as a result of the present invention, there will be fewer instances wherein programs are started and are not received at various points in a network because of the non-switching or improper switching of the amplifiers therein.

The invention may be understood from the following description when taken with respect to the associated drawings which show preferred embodiments in which the invention is presently incorporated. It is to be understood, however, that the invention is not limited to incorporation in the embodiments disclosed herein, but may be practiced in other forms which will be readily suggested to those skilled in the art from a consideration of the following.

Before describing the invention, the arrangement of the prior art disclosed in Fig. 1 will first be described so that the reader may have an understanding of the difficulties inherent in the arrangement of the prior art which the present invention is designed to obviate.

Figure 1:
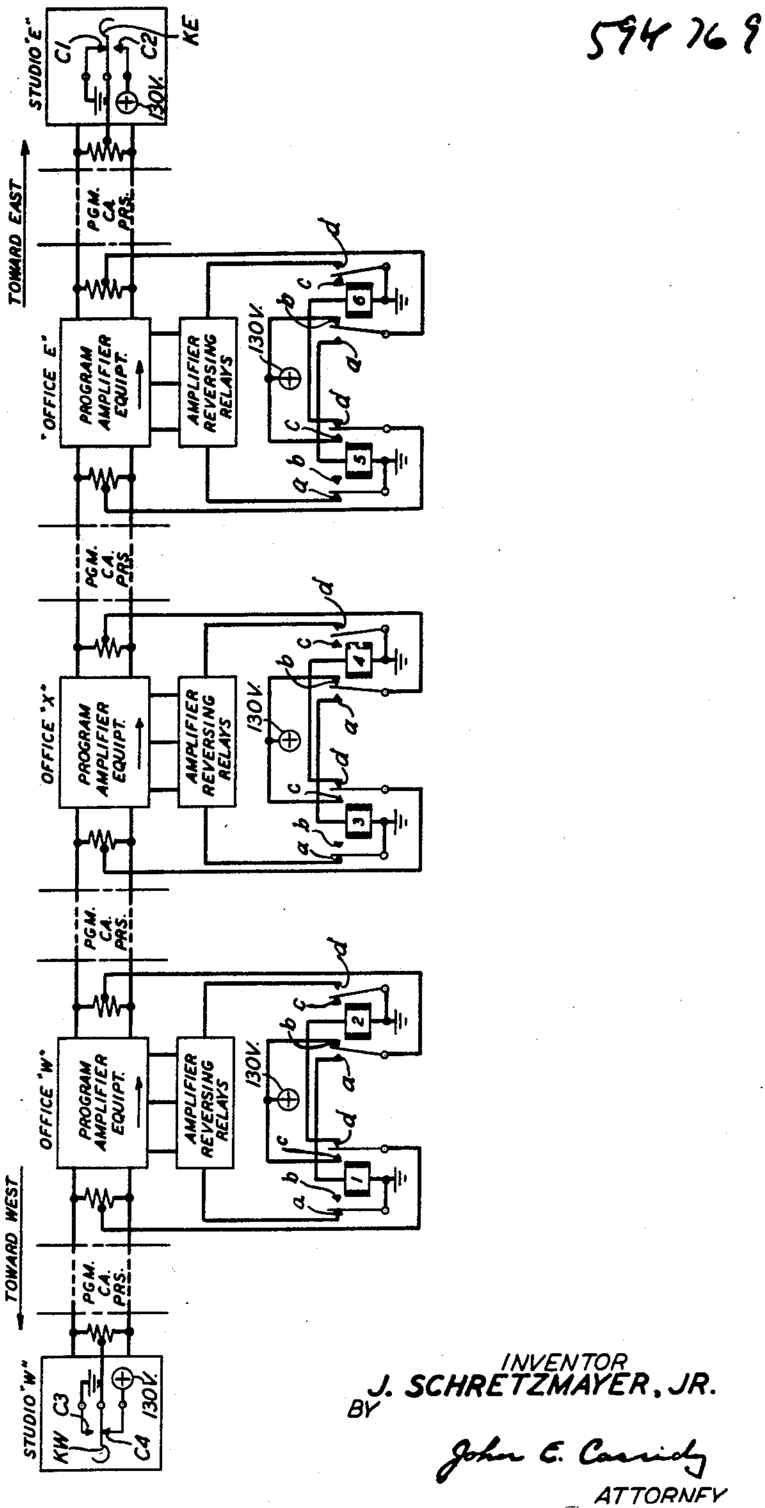
FIG. 1 PRIOR ART
Fig. 1 shows a program switching arrangement of the prior art, such as is presently employed in a large well-known system, which arrangement the present invention is designed to replace.

Refer now to Fig. 1. Fig. 1 shows a radio broadcast network wherein a studio designated studio E, assumed to be located at the easterly end of the network, is connected through four simplex circuits SX1, SX2, SX3 and SX4, connected in tandem, through an office E, an office X and an office W to a studio W, respectively, assumed to be located at the westerly end of the network Each of the simplex circuits comprises a pair of balanced conductors interconnected at each end by means of a resistor with a connection from the apex or mid-point of the resistor at each station to the local equipment.

In order to facilitate an understanding of the operation of the circuit of Fig. 1, it appears desirable to first consider its condition during the last preceding cycle of operation, when contact C2 of key KE at studio E was closed to assume control and contact C3 of key KW at studio W was closed to relinquish control of broadcasting.

At this time each relay in Fig. 1 was in a condition opposite from that shown in Fig. 1. That is to say, the odd numbered relays in Fig. 1 were operated and even numbered relays were released.

It is apparent that the even numbered relays in Fig. 1, on the previous cycle were released when contact C3 of key KW at studio W was closed, while studio E was broadcasting, because at such time ground would be connected to both ends of the simplex circuit SX4 extending through the winding of relay 2. When relay 2 is released, all even numbered relays are released, because relays 2 and 4 are required to be operated to supply battery through their respective contacts *b* and the respective simplex circuits SX3 and SX2 to operate relays 4 and 6, respectively. With relay 6 released for the assumed condition, all odd numbered relays are operated. Relay 5 is operated from battery through contact C2 of key KE over the simplex circuit SX1 from studio E to office E, contact *a* of relay 6 and the winding of relay 5 to ground. Relays 3 and 1 are operated from battery through contacts *c* of relays 5 and 3, respectively, over their respective simplex circuits SX2 and SX3 and the windings of relays 3 and 1, respectively, to ground.

It will be observed that in this last previous cycle of operation, when studio E was to start broadcasting, in response to the actuation of key KW to close its contact C3 to relinquish control at the west studio, first the even numbered relays were released in order 2—4—6. Then in joint response to this and the operation of key KE to close its contact C2 at the east studio, the odd numbered relays were operated in order 5—3—1. As the odd numbered relays were operated in order 5—3—1, with the even numbered relays previously released, ground through contact *d* of relays 6—4—2, in named order become effective to reverse the condition of the amplifier reversing relays, well-known in the art, and their respective amplifiers, starting at office E, adjacent studio E, and proceeding in sequence toward the west. Under this arrangement, the most remote amplifier is switched last and no signal is available at studio E, to indicate that the switching of the amplifiers has been effected, nor can a signal be provided at studio E to afford this information except by providing an additional path from the most remote studio, with respect to the new broadcasting point, all the way back to the new broadcasting point.

Now, for the present cycle of operation, it will be assumed that the key KE at studio E is operated to close contact C1 to relinquish control and contact C4 of key KW at studio W is actuated to assume control. This is the condition of each key as shown on the drawing.

Before the start of this operation, as should be understood from the foregoing, all odd numbered relays are operated and all even numbered relays are released. In response to the opening of contact C2 of key KE, battery is disconnected from the path through the winding of relay 5 and it releases as shown. The release of relay 5 by opening its contact *c*, releases relay 3, by disconnecting battery from the path through the winding of relay 3. The release of relay 3 by opening its contact *c* disconnects battery from the path through the winding of relay 1 which releases. The release of relay 1 connects battery through contact C4 of key KW over the simplex SX4 from studio W to office W, contact *d* of relay 1 and the winding of relay 2 to battery operating relay 2. The opening of contact *d* of relay 2 while contact *a* of relay 1 is closed effectively supplies ground to the amplifier reversing relays at office W, operating these relays and reversing the program amplifier thereat so that it is directed away from studio W toward studio E. The operation of relay 2 in turn supplies battery through its contact *b* to operate relay 4 which in turn operates relay 6. When relays 4 and 6 operate in succession, with relays 3 and 5 released, as shown, the ground through contacts *a* of relays 3 and 5, respectively, becomes effective to reverse the amplifiers at office X and then at office E in succession. It should be apparent that once again the amplifiers are reversed in succession starting adjacent the studio where the program is to originate and progressing in the order of their increasing distance from that studio. Once again it would not be possible to provide a signal, from the amplifier which was last to be reversed, back to the studio from which the program is now to originate to indicate that broadcasting may proceed except by furnishing a circuit extending the entire length of the system.

Figure 2:
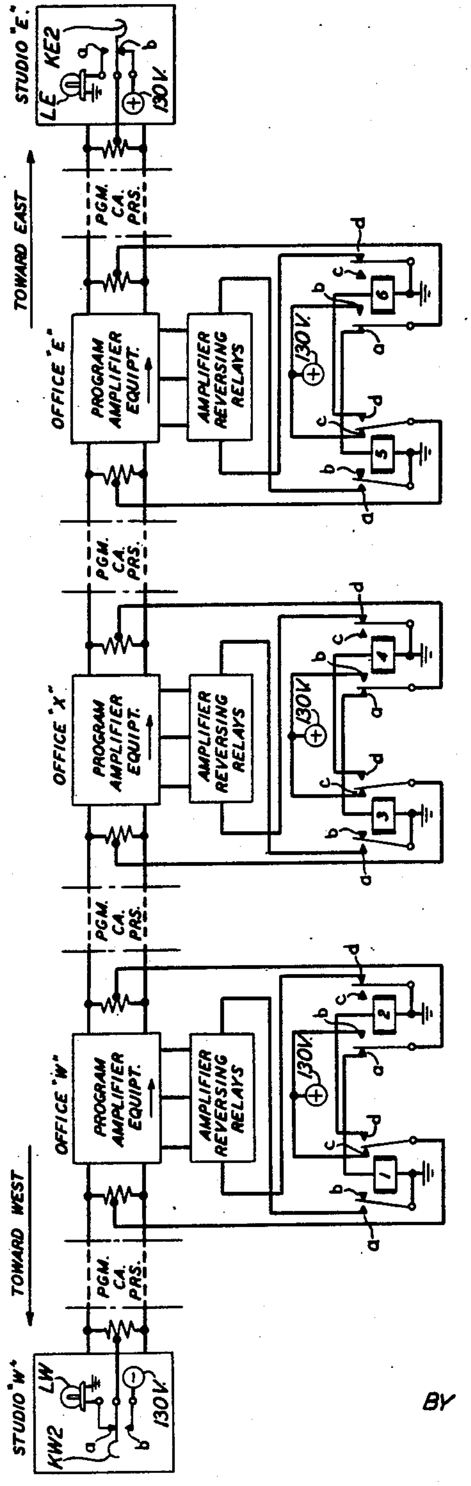
Fig. 2 shows the new program switching circuit of the present invention applied to a network which does not include bridging circuits.

Refer now to Fig. 2, which shows the improved circuit of the present invention. In Fig. 2 it is again assumed that studio E has just concluded transmitting and has thrown key KE2 to engage contact *b* so as to relinquish control of the network and that studio W is to be the next studio to transmit and that key KW2 thereat has been actuated to close its contact *a* so as to assume control of the network.

Again to facilitate understanding of the operation of the circuit of Fig. 2, its operation will be explained for the preceding cycle of operation, when studio W relinquished control and studio E assumed control. At that time both keys and all relays were in a condition opposite from that shown in Fig. 2. That all relays are in the opposite condition is apparent when it is considered that when key KE2 engages its contact *a* relay 5 will be released whatever the condition of relay 6, as ground is connected to the both ends of simplex circuit SX1 which is the only operating path available to relay 5. With relay 5 released, all odd numbered relays will be released successively in the order 5—3—1, since contacts *c* of relays 5 and 3 are open and battery is disconnected from the path through the windings of relays 3 and 1. With relay 1 released and contact *b* of key KW2 closed, a circuit is established from battery through contact *b* of key KW2 over the simplex SX4 from studio W to office W, contact *d* of relay 1 and the winding of relay 2 to ground operating relay 2. With contact *a* of relay 1 closed and contact *d* of relay 2 open, ground through contact *a* of relay 1 is effective to control the amplifier reversing relays so that they direct the amplifier at office W to transmit from studio W toward the west. With relay 2 operated and relay 3 released relay 4 operates. With relay 4 operated and relay 3 released the amplifier at office X is directed toward the west. With relay 4 operated and relay 5 released, relay 6 operates and the amplifier at office E is directed toward the west. When relay 6 operates a circuit is established from battery through contact *b* of relay 6 over simplex circuit SX1 contact *a* of key KE2 and the filament of lamp LE at studio E lighting the lamp as an indication that all of the amplifiers are properly directed toward the west, so that the program from studio E may start. It will be observed that for this cycle of operation the amplifier most remote from studio E was first reversed followed progressively by the reversal of those closer to studio E in the order of their decreasing remoteness from studio E where the new program was to originate. Finally the amplifier nearest the station is reversed and the lamp LE at studio E is lighted to indicate that the reversing of the amplifiers is complete.

Now to consider the operation of Fig. 2 for the present cycle, that is for the condition as shown in the figure with the key KE2 at the east studio operated to close its contact *b* to relinquish control and with key KW2 at the west studio operated to close its contact *a* to assume control. The relays are shown in the conditions they assume when operation is complete. However, it will be recalled that at the end of the last cycle of operations relays 2, 4 and 6 were operated and relays 1, 3 and 5 were released.

In response to the closing of contact *a* of key KW2 relay 2 will be released since ground will be connected to both ends of simplex circuit SX4, which is the only circuit available for control of relay 2. With relay 2 released, battery is disconnected from its contact *b* releasing relay 4. With relay 4 released battery is disconnected from its contact *b* releasing relay 6. At this juncture all relays are released.

With relay 6 released battery through contact *b* of key KE2 over simplex SX1 and contact *a* of relay 6 operates relay 5. With relay 5 operated and relay 6 released ground through contact *d* of relay 6 controls the amplifier reversing relays to direct the amplifier at office E toward the east. The operation of relay 5 supplies battery through contact *c* of relay 5 over simplex SX2, contact *a* of relay 4 and the winding of relay 3 operating relay 3. With relay 3 operated and relay 4 released, ground through contact *d* of relay 4 controls the amplifier reversing relays at office X to direct the amplifier at office X toward the east. With relay 3 operated battery through contact *c* of relay 3 of simplex circuit SX3, contact *a* of relay 2 and the winding of relay 1 to ground operates relay 1. With relay 1 operated and relay 2 released the amplifier reversing relay at office W are controlled to direct the amplifier at office W toward the east. With relay 1 operated, battery through contact *c* of relay 1 over simplex circuit SX4, contact *a* of key KW2 and the filament of lamp LW to ground, lights lamp LW at the studio W as a signal that the reversal of the amplifiers is complete. No additional circuit is required. Thus, a new function is provided by the circuit of Fig. 2. Once again, the amplifiers are reversed in the order of their diminishing remoteness from the studio where the broadcasting is to begin. Since the last amplifier to be reversed is the one adjacent the studio which is to broadcast a condition can be imposed on the available simplex interconnecting the adjacent amplifier and the studio to light the lamp thereat to indicate that the last amplifier to be required to be reversed is in fact reversed and broadcasting may start at the west station immediately.

Attention is called to the fact that in the circuits of Fig. 1 and Fig. 2 only three amplifier offices are shown. However, in actual practice on most circuits there will be a much larger number. On a circuit connecting New York City and Los Angeles for instance, assuming forty mile spacing between amplifier offices, there will be approximately 70 amplifiers. It is apparent from the description, that on such a circuit first a relay at each one of the 70 stations would be required to operate in sequence in one direction followed by the operation of another in the opposite direction in sequence. This would require the sequential operation of 140 relays. In the circuit of Fig. 1, an attendant at the studio where the next program is to originate would be required to estimate when this operation was completed and then to start broadcasting. In the event that any portion of the circuit were in difficulty, the attendant would have no means of knowing it. On such occasions portions of programs could be lost as they sometimes are. Contrasted with this, in the arrangement of Fig. 2, when the last amplifier is switched, the studio where the next program is to originate receives a signal and the program may be started immediately. The reception of the signal serves as a plausible indication that all amplifiers have been switched. It does not provide positive assurance that all amplifiers have been switched. The indication is that the chain circuit which controls the amplifier reversing relays is intact. There still could be a local trouble at any amplifier office, which could cause malfunctioning of the amplifier reversing relays, or some other portion of the circuit within an office. However, it has been found that with proper maintenance the percentage of troubles attributable to malfunctioning of the amplifier reversing relays is negligible and as a practical matter the reception of the lighted lamp signal would be almost a positive indication of the proper direction of all amplifiers. There is another advantage available from the arrangement of Fig. 2, that is the failure of the reception a signal is a positive indication of trouble. After the termination of an interval estimated to be sufficient to permit amplifier reversal, on a circuit such as Fig. 1, provided with no signal, the studio attendant may start broadcasting on an open circuit. It will probably be some minutes before any one is notified to start to look for the trouble. By contrast on networks equipped with Fig. 2 the studio attendant is aware of the trouble as soon as it becomes apparent that no signal is to be received. Search for the trouble may be undertaken immediately. This is one of the most important advantages afforded by the circuit of the invention over that of the prior art. The new circuit thus affords the following advantages over the circuit of the prior art as a result of its new function:

(1) It prevents the start of broadcasting if no signal is received to indicate that all amplifiers are properly directed;

(2) It saves time formerly lost before broadcasting starts, because broadcasting can now start the instant the signal is received, whereas formerly a margin of some records was added, to the estimated interval required for reversal, for insurance sake;

(3) In case of trouble, indicated by failure of reception of a signal, search for the trouble may start immediately, whereas formerly, when no signal was available, broadcasting started with the studio attendant unaware of the trouble and frequently several minutes or more elapsed before search for the trouble was started.

Figure 3:
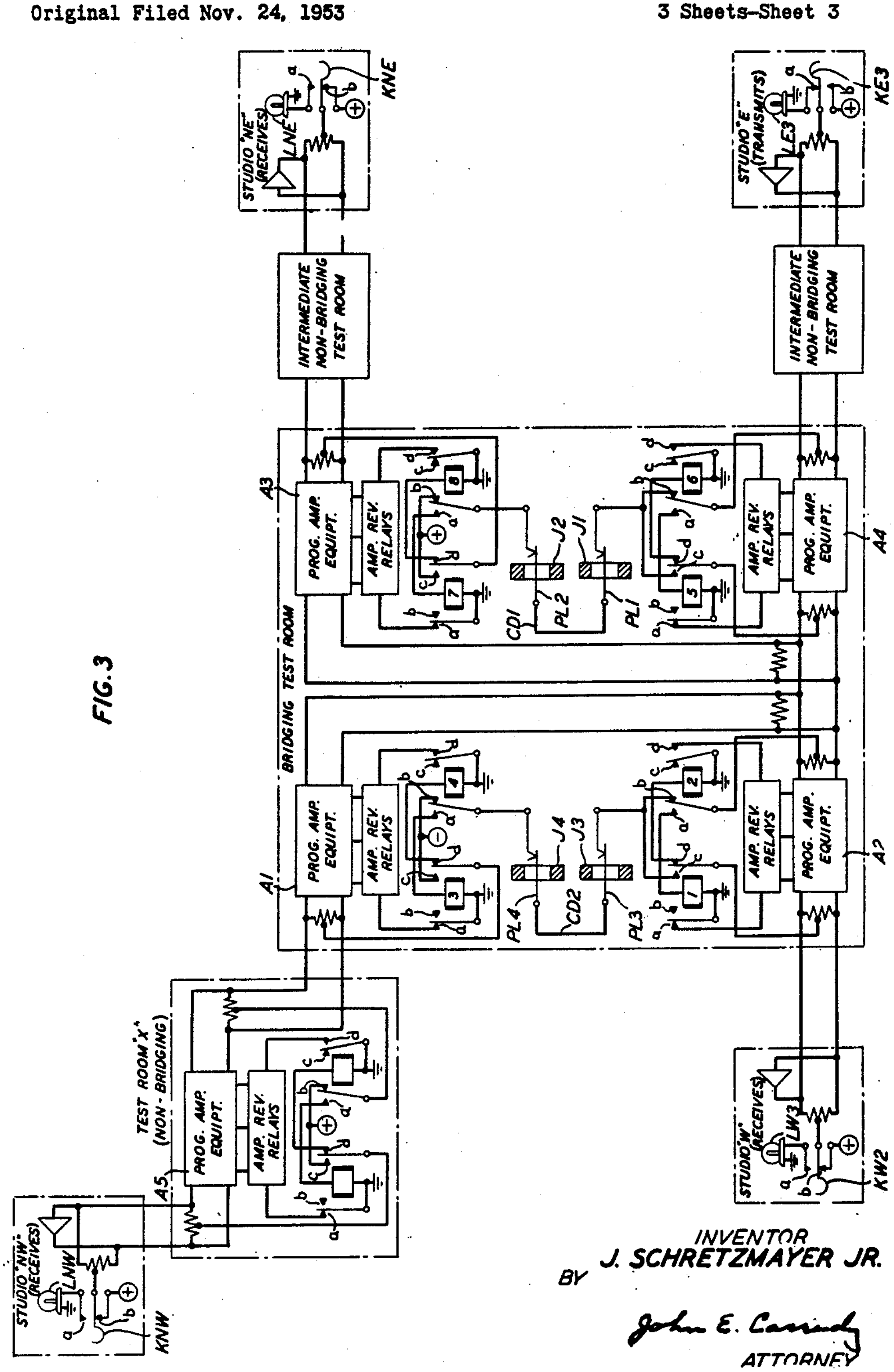
Fig. 3 shows the program switching circuit of the present invention applied to a network which includes a bridging circuit.

Refer now to Fig. 3 which shows an arrangement wherein four studios, designated studio E, studio W, studio NE and studio NW are interconnected in a system which includes one bridging test room and one non-bridging test room, indicated by dash-dot captioned rectangles in Fig. 3. In the arrangement shown in Fig. 3, two additional non-bridging test rooms, are indicated, one as interconnectable between studio E and the bridging test room and the other between studio NE and the bridging test room. These non-bridging test rooms are not shown in detail but may be arranged in the same manner as shown in full for non-bridging test room X, at the upper left in Fig. 3. In the arrangement shown on the drawing, studio E is presently transmitting and the other three studios are receiving.

First the condition of the circuit while studio E is transmitting will be described. For this condition, the lamp LE3 at studio E is lighted and the other lamps at the other three studios are extinguished. A circuit may be traced from ground through the filament of lamp LE3, contact *a* of key KE3, over the simplex circuit from studio E through the non-bridging test room, if included, to the bridging test room through contact *b* of relay 6, contact of jack J1, plug PL1, cord CD1, plug PL2, contact of jack J2 and contact *b* of relay 8 to battery. The lamp LE3 is lighted over this path. A circuit may also be traced from ground through the winding of relay 6, contact *d* of relay 5, over the simplex interconnecting amplifier A4 and amplifier A2, contact *b* of relay 2, contact of jack J3, plug PL3, cord CD2, plug PL4, contact of jack J4 and contact *b* of relay 4 to battery operating relay 6. The cords and jacks are provided to permit flexible switching of facilities. A circuit may also be traced from ground through the winding of relay 4, contact *d* of relay 3, over the simplex interconnecting the bridging test room and the non-bridging test room X and contact *b* of relay 10 to battery operating relay 4. A circuit may also be traced from ground through the winding of relay 10, contact *d* of relay 9, over the simplex interconnecting test room X to studio NW and contact *b* of key NW to battery, operating relay 10. A circuit may also be traced from ground through the winding of relay 2, contact *d* of relay 1 over the simplex from amplifier A2 to studio W and through contact *b* of key KW2 to battery operating relay 2. A circuit may also be traced from ground through the winding of relay 8, contact *d* of relay 7, over the simplex interconnecting amplifier A3 to studio NE and through contact *b* of key KNE to battery operating relay 8. It will thus be seen for this condition, all of the even numbered relays in the system are operated. It will be observed too, that the circuit through the winding of each of the odd numbered relays in the system is open at a contact of the operated even numbered relay of the corresponding pair, so that for this condition all odd numbered relays are released. With relay 2 operated and relay 1 released, the relays controlling the switching of amplifier A2 are in condition to direct amplifier A2 so that it transmits toward studio W. With relay 4 operated and relay 3 released, the relays associated with amplifier A1 are in condition to direct the program toward test room X. With relay 6 operated and relay 5 released, the relays associated with amplifier A4 are in condition to direct the program away from studio E. With relay 8 operated and relay 7 released, the relays associated with amplifier A3 are in condition to direct the program toward studio NE. With relay 10 operated and relay 9 released, the relays associated with amplifier A5 are in condition to direct the program toward studio NW. This is the condition which prevails when the program is originating at studio E. Now the network is to be switched so that the program originates at some other one of the studios in the system and it will be assumed that the next program is to originate in studio NW.

When studio NW is to take control, key KNW is actuated so as to close its contact *a* to assume control of the program. Key KE3 at studio E is actuated to engage its contact *b* so as to relinquish control. When battery is disconnected from contact *b* of key KNW at studio NW, relay 10, which obtained its battery through this contact over a circuit previously traced, will release. The release of relay 10 by opening its contact *b* will release relay 4. The release of relay 4 by opening its contact *b* will release relay 6. Relay 2 will remain operated since its operating path is undisturbed. Relay 8 will also remain operated since its operating path too is undisturbed. When key KE3 at studio E was actuated to close its contact *b* battery was connected through contact *b* of key KE3 over the simplex circuit through contact *a* of relay 6 and the winding of relay 5 to ground operating relay 5. This establishes a circuit from battery through contact *b* of rely 8, contact of jack J2, plug PL2, cord CD1, plug PL1, contact of jack J1, contact *c* of relay 5 over the simplex circuit from amplifier A4 to amplifier A2, through contact *b* of relay 2, contact of jack J3, plug PL3, cord CD2, plug PL4, contact of jack J4, contact *a* of relay 4 and the winding of relay 3 to ground operating relay 3. The operation of relay 5 and release of relay 6 establishes a circuit from ground, through contact *d* of relay 6 into the amplifier reversing relays which switch amplifier A4 so as to direct the program toward studio E. The operation of relay 3 and release of relay 4 establishes a circuit from ground through contact *d* of relay 4 and the amplifier reversing relays of amplifier A1, switching amplifier A1 so as to direct the program away from test room X and studio NW. The operation of relay 3 establishes a circuit from battery through contact *c* of relay 3 over the simplex circuit from the bridging test room to test room X, through contact *a* of relay 10 and the winding of relay 9 to ground operating relay 9. This establishes a circuit from battery through contact *c* of relay 9 over the simplex from test room X to studio NW through contact *a* of key KNW and the filament of lamp LNW to ground lighting lamp LNW. The operation of relay 9 and release of relay 10 establishes a circuit from ground through contact *d* of relay 10 into the reversing relays for amplifier A5 which switch amplifier A5 so as to direct the program away from studio NW.

It will be noted that amplifiers A4, A1 and A5 were reversed in the stated order as the result of the application of control battery at studio E. Since it is not possible for amplifier A5 to reverse before amplifiers A4 and A1 are reversed, and since the signal light in lamp LNW is received only at the time amplifier 5 reverses, there is reasonable assurance that the section of the network required to be reversed has been properly conditioned when lamp LNW is lighted at studio NW.

It will now be assumed that the program has been concluded at studio NW and that the next program is to come from studio NE. Studio NE, therefore, operates key KNE which applies ground through the filament of the signal lamp LNE. While contact *b* of key KNE was closed, battery supplied through this contact maintained relay 8 operated over a circuit heretofore traced. The disconnection of battery, by opening contact *b* of key KNE, now releases relay 8. Relay 2 remains operated from battery through contact *b* of key KW2 and relay 5 remains operated from battery through contact *b* of key KE3. With relay 8 released, battery is disconnected from contact *b* of relay 8 which formerly maintained relay 3 operated over a circuit heretofore traced and relay 3 releases. The release of relay 3 by opening contact *c* of relay 3 releases relay 9 over a circuit heretofore traced. With relay 9 released, a circuit may be traced from battery through contact *b* of key KNW over the simplex extending from studio NW to test room X through contact *d* of relay 9 and the winding of relay 10 to ground operating relay 10. The operation of relay 10 with relay 9 released operates the reversing relays for program amplifier A5 which is thereupon reversed to direct the program toward studio NW. With relay 10 operated a circuit may be traced from battery through contact *b* of relay 10, over the simplex from test room X to the bridging test room through contact *d* of released relay 3 and the winding of relay 4 to ground operating relay 4. With relay 4 operated and relay 3 released, the amplifier reversing relays associated with program amplifier A1 are actuated to switch the program amplifier so as to direct the program toward test room X and studio NW. With relay 4 operated, a circuit may be traced from battery through contact *b* of relay 4, contact of jack J4, plug PL4, cord CD2, plug PL3, contact of jack J3, contact *b* of relay 2 over the simplex circuit from program amplifier 2 to program amplifier 4, through contact *c* of relay 5, contact of jack J1, plug PL1, cord CD1, plug PL2, contact of jack J2, contact *a* of relay 8 and the winding of relay 7 to ground operating relay 7. With relay 7 operated and relay 8 released, the amplifier reversing relays associated with program amplifier A3 are reversed so as to direct the program about to originate at studio NE away from the studio. With relay 7 operated, a circuit may be traced from battery through contact *c* of relay 7, over the simplex connecting the bridging test room and studio NE, through contact *a* of key KNE and the filament of lamp LNE to ground lighting lamp LNE as a signal that the amplifiers required to be switched in the path in connecting studio NW and studio NE have in fact been switched. Since it is understood that the other portions of the circuit have remained undisturbed, the lighting of lamp LNE at studio NE will serve as an indication that the network is ready and the program may proceed.

It will be noted in the operation of the circuit described in the last preceding paragraph, that the amplifiers were switched progressively in the direction from studio NW toward studio NE and that the last amplifier to be switched was the one adjacent studio NE. Therefore, upon the reception of the lighted lamp signal at lamp LNE, the broadcasting of the program may proceed immediately without waiting for an interval to permit more remote amplifiers to be switched in the proper direction as in the case of the circuit of the prior art.

It will now be assumed that the program which originated at studio NE has been concluded and that the next succeeding program is to originate at studio W. Studio W, therefore, supplies ground through the signal lamp LW3 by closing contact *a* of key KW2 and opening its contact *b*. The disconnection of battery theretofore supplied through contact *b* of key KW2, releases relay 2. The circuit for operating relay 2 was heretofore traced. The release of relay 2 disconnects battery which was formerly supplied through contact *b* of relay 4 over a circuit heretofore traced through the winding of relay 7 and relay 7 releases. Relay 4 remains operated because the portion of the circuit interconnecting it to studio NW remains undisturbed. Relay 5 also remains operated because the circuit connecting it to battery through contact *b* of key KE3 also remains undisturbed. Key KNE at studio NE is actuated to open contact *a* and close contact *b* thereby reconnecting battery to the operating circuit of relay 8 which thereupon reoperates. The operation of relay 8 with relay 7 released actuates the amplifier reversing relays associated with amplifier A3 to reverse amplifier A3, so as to now direct the program toward studio NE. The operation of relay 8 establishes a circuit from battery through contact *b* of relay 8, contact of jack J2, plug PL2, cord CD1, plug PL1, contact of jack J1, contact *c* of relay 5 over the simplex from amplifier A4 to amplifier A2, through contact *a* of relay 2 and the winding of relay 1 to ground operating relay 1. The operation of relay 1 with relay 2 released actuates the amplifier reversing relays associated with program amplifier A2 so as to switch amplifier A2 to direct the program about to originate at studio W away from studio W. A circuit may now be traced from battery through contact *b* of relay 4, contact of Jack J4, plug PL4, cord CD2, plug PL3, contact of jack J3, contact *c* of relay 1, over the simplex connecting the bridging test room and studio W, contact *a* of key KW2 and the filament of lamp LW3 to ground lighting lamp LW3.

Once again it will be observed that the amplifiers required to be switched are switched successively along the path toward the station where the next succeeding program is to originate and the program may be started immediately upon the lighting of the signal lamp at that station which indicates that the amplifiers have in fact been switched.

It will now be assumed that the program originating at studio W has been concluded and that the next succeeding program is to originate at studio E. Key KW2 at studio W will be actuated to open its contact *a* to disconnect the lamp LW3 and to close its contact *b* to connect battery through the key. Key KE3 at studio E is actuated to close its contact *a* and open its contact *b*. The disconnection of battery through contact *b* of key KE3 releases relay 5. The circuit has heretofore been traced. The release of relay 5 by opening its contact *c* disconnects battery supplied through contact *b* of relay 8 from the circuit extending through the winding of relay 1 and relay 1 releases. Relay 4 remains operated as the portion of the circuit interconnecting it to studio NW remains undisturbed. Relay 8 remains operated as the portion of the circuit interconnecting it to studio NE remains undisturbed. Relay 2 operates from battery connected through contact *b* of key KW2 at studio W. With relay 2 operated and relay 1 released, the amplifier reversing relays associated with program amplifier A2 are actuated so as to switch the amplifier to direct the program toward studio W. The operation of relay 2 also reestablishes the circuit traced from battery through contact *b* of operated relay 4 which extended through contact *b* of operated relay 2 and through the winding of relay 6 to ground reoperating relay 6. The operation of relay 6 with relay 5 released actuates the amplifier reversing relays associated with program amplifier A4 so as to reverse amplifier A4 to direct the program away from studio E. Battery is again supplied through contact *b* of relay 8 and contact *b* of operated relay 6 over a circuit heretofore traced in detail through the filament of lamp LE3 to ground, lighting lamp LE3 at studio E. It will be observed once more that the amplifiers are reversed successively in a direction toward the point of origination of the new program at station E and the lighting of the lamp LE3 serves as an indication of this condition and that the program may proceed. It will be observed also that the operation of the circuit per Fig. 3 has been disclosed in detail with respect to programs originating at each of the stations starting with studio E and finally returning to studio E.

What is claimed is:

1. A program transmission circuit for controlling a studio start broadcast signal, said circuit interconnecting a first studio and a second studio, said circuit extending in tandem through a chain of amplifier stations intermediate said studios, an amplifier and amplifier reversing means at each of said stations, a control switch for said reversing means at each of said studios, a chain of simplex circuits derived from said transmission circuit interconnecting said switch at said first studio through said reversing means at each of said stations in tandem to said switch at said second studio, means comprising said switches and simplex circuits for directing said amplifiers so as to transmit a program from said first studio over said transmission circuit through all of said amplifiers to said second studio, other means comprising said simplex circuits responsive to the actuation of said switch at said second studio for first consecutively, preconditioning each of said reversing means in the direction from said second studio to said first studio along said transmission circuit, means comprising said simplex circuits responsive to the actuation of said switch at said first studio and incident to said preconditioning for consecutively actuating each of said reversing means along said chain in a direction from said first studio to said second studio, so as to reverse the amplifier nearest said second studio after all others have been reversed, a start broadcast signal connected to said switch at said second studio and means comprising said simplex circuit connected directly to said second studio and incident to the reversal of said amplifier nearest said second studio, for activating said signal, to indicate that said second studio may broadcast without delay as all amplifiers are properly directed.

2. A program transmission circuit including start broadcast signals, said circuit extending from a first studio through a first amplifier at a first station and a second amplifier at a second station to a second studio, a first amplifier direction reversing circuit comprising a first and a second control relay at said first station, a second amplifier direction reversing circuit comprising a third and a fourth control relay at said second station, a first and a second program direction control switch at said first and said second studio, respectively, one of said start broadcasting signals connected to said switch at each of said studios, a first, second and third simplex circuit, each derived from said transmission circuit, connected in tandem between said first switch and said first and second relays, between said first and second relays and said third and fourth relays and between said third and fourth relays and said second switch, respectively, means connected to said first simplex circuit responsive to the actuation of said first switch, to assume control of said program circuit, for releasing said second relay, means connected to said second simplex circuit responsive to the release of said second relay for releasing said fourth relay, means connected to said third simplex circuit jointly responsive to the release of said fourth relay and the actuation of said second switch, to relinquish control of said program circuit, for operating said third relay and reversing said second amplifier, means connected to said second simplex circuit responsive to the operation of said third relay for actuating said first relay and reversing said first amplifier, and means connected to said first simplex circuit responsive to the operation of said first relay for actuating said start broadcast signal at said first studio, to indicate that all amplifiers are properly directed and that the broadcast may start at said first studio.

References Cited in the file of this patent

UNITED STATES PATENTS

| | | |
|---|---|---|
| 1,434,790 | Mills | Nov. 7, 1922 |
| 1,570,770 | Nyquist | Jan. 26, 1926 |
| 1,722,039 | Dudley | July 23, 1929 |
| 2,198,326 | Bachelet | Apr. 23, 1940 |
| 2,344,166 | Ullman | Mar. 14, 1944 |